(12) United States Patent
Kang (10) Patent No.: US 11,507,093 B2
(45) Date of Patent: Nov. 22, 2022

(54) BEHAVIOR CONTROL DEVICE AND BEHAVIOR CONTROL METHOD FOR AUTONOMOUS VEHICLES

(71) Applicants: HYUNDAI MOTOR COMPANY, Seoul (KR); KIA MOTORS CORPORATION, Seoul (KR)

(72) Inventor: Dong Hoon Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 324 days.

(21) Appl. No.: 16/822,619

(22) Filed: Mar. 18, 2020

(65) Prior Publication Data

US 2021/0080956 A1 Mar. 18, 2021

(30) Foreign Application Priority Data

Sep. 16, 2019 (KR) .......................... 10-2019-0113714

(51) Int. Cl.
*G05D 1/00* (2006.01)
*B62D 15/02* (2006.01)
(Continued)

(52) U.S. Cl.
CPC ....... *G05D 1/0088* (2013.01); *B62D 15/0215* (2013.01); *G05D 1/0221* (2013.01); *G05D 1/0223* (2013.01); *G06N 3/08* (2013.01); *G05D 2201/0212* (2013.01); *G05D 2201/0213* (2013.01)

(58) Field of Classification Search
CPC ............... G05D 1/0088; G05D 1/0221; G05D 2201/0212; G05D 1/0223; G05D 1/0212; G05D 2201/0213; G06N 3/08; G06N 3/0445; G06N 3/0454; B62D 15/025; B62D 15/0215; B60W 30/02; B60W 60/001; B60W 2554/4042; B60W 2554/804;
(Continued)

(56) References Cited

U.S. PATENT DOCUMENTS 10,759,446 B2 * 9/2020 Motomura ........... G06V 20/597
11,273,836 B2 * 3/2022 Zheng .................. G05D 1/0212
(Continued)

FOREIGN PATENT DOCUMENTS

CN 108657163 A * 10/2018 ............ B60W 10/20
WO WO-2014045355 A1 * 3/2014 ............ B60W 20/11

OTHER PUBLICATIONS

Wu et al.; Learning driving behavior for autonomous vehicles using deep learning based methods; 2019 IEEE 4th International Conference on Advanced Robotics and Mechatronics (ICARM); pp. 905-910 (Year: 2019).*

(Continued)

*Primary Examiner* — Michael J Zanelli
(74) *Attorney, Agent, or Firm* — Morgan, Lewis & Bockius LLP (57) ABSTRACT

A behavior control device and a behavior control method for an autonomous vehicle are provided. The behavior control device includes a learning device configured to perform deep learning of a behavior pattern of a vehicle according to a driving environment and a controller configured to control a behavior of the autonomous vehicle based on a result of the learning of the learning device.

17 Claims, 6 Drawing Sheets

(51) Int. Cl.
*G05D 1/02* (2020.01)
*G06N 3/08* (2006.01)

(58) Field of Classification Search
CPC ...... B60W 10/20; B60W 30/14; B60W 40/02; B60W 40/105; B60W 2050/0026; B60W 2520/10
See application file for complete search history.

(56) References Cited

U.S. PATENT DOCUMENTS

| | | |
|---|---|---|
| 2018/0275657 A1* | 9/2018 | You .................... G05B 23/0294 |
| 2019/0049967 A1* | 2/2019 | Lim ..................... G05D 1/0221 |
| 2019/0235515 A1* | 8/2019 | Shirvani .............. G05D 1/0214 |
| 2020/0356828 A1* | 11/2020 | Palanisamy ............ G06N 3/006 |
| 2020/0387161 A1* | 12/2020 | Al Qizwini .......... G05D 1/0246 |
| 2021/0011481 A1* | 1/2021 | Cho ..................... G05D 1/0088 |
| 2021/0097783 A1* | 4/2021 | Soltani Bozchalooi ..................... G07C 5/0808 |
| 2021/0107487 A1* | 4/2021 | Oh ......................... G06V 20/58 |
| 2021/0200212 A1* | 7/2021 | Urtasun ............. B60W 60/0011 |

OTHER PUBLICATIONS

Miglani et al.; Deep learning models for traffic flow prediction in autonomous vehicles: A review, solutions, and challenges; Vehicular Communications 20 (2019); Elsevier; pp. 1-36 (Year: 2019).*

Rao et al.; Deep Learning for Self-Driving Cars: Chances and Challenges; 2018 ACM/IEEE 1st International Workshop on Software Engineering for AI in Autonomous Systems; pp. 35-38 (Year: 2018).*

* cited by examiner

BEHAVIOR CONTROL DEVICE AND BEHAVIOR CONTROL METHOD FOR AUTONOMOUS VEHICLES

CROSS-REFERENCE TO RELATED APPLICATION

The present application claims priority to and the benefit of Korean Patent Application No. 10-2019-0113714, filed on Sep. 16, 2019, which is incorporated herein by reference in its entirety.

TECHNICAL FIELD

The present disclosure relates to a technique for performing deep learning of a behavior pattern of a vehicle according to a driving environment and then controlling a behavior of an autonomous vehicle based on the behavior pattern.

BACKGROUND

The statements in this section merely provide background information related to the present disclosure and may not constitute prior art.

In general, a behavior control device of an autonomous vehicle may include a plurality of sensors, a fusion device for fusing a plurality pieces of sensor data measured by the plurality of sensors, and a controller for transmitting a control value (or a control signal) to a sub-controller (e.g., a steering controller, an acceleration controller, a deceleration controller) mounted on the autonomous vehicle.

The fusion device may transmit a result of fusion of the pieces of sensor data (hereinafter, referred to as fusion data) to the controller at a first transmission period (for example, 100 ms), and the controller may generate a control value corresponding to the fusion data and transmit the control value to the sub-controller at a second transmission period (for example, 10 ms). In this case, a temporal gap may be caused between the first transmission period and the second transmission period because the first transmission period and the second transmission period are different.

The controller may need to receive the fusion data from the fusion device at a period of 10 ms to normally transmit the control value to the sub-controller, which is impossible in the view of the performance of the fusion device. Therefore, the controller generates a control value corresponding to fusion data received from the fusion device at a first period and repeatedly transmit the control value to a sub-controller at a period of every 10 ms until the next fusion data is transmitted. In this case, the control value, which is first transmitted, may be a control value reflecting the behavior of the autonomous vehicle. Thereafter, the control value may be a control value that does not reflect the behavior of the autonomous vehicle until the next fusion data is received.

The controller may transmit the first control value that does not reflect the behavior of the autonomous vehicle to the sub-controller, and when the next fusion data is received, may transmit the second control value reflecting the behavior of the autonomous vehicle to the sub-controller. Due to this, a large gap occurs between the first control value and the second control value, which may cause a sudden behavior of the autonomous vehicle, giving anxiety to an occupant.

For example, when the autonomous vehicle is driving at a low speed in a congestion situation, the gap (longitudinal control) between the first control value and the second control value may cause a rapid acceleration or a rapid deceleration of the autonomous driving vehicle, which may cause collision between the autonomous vehicle and a preceding vehicle or shifting shock in the autonomous vehicle (shaking frontward/backward).

As another example, when the autonomous vehicle is driving at a high speed, the gap (lateral control) between the first control value and the second control value may cause sudden steering of the autonomous vehicle, giving anxiety to the occupant.

The matters described in this Background are intended to enhance the understanding of the background of the disclosure, and may include matters not previously known to those of ordinary skill in the art.

SUMMARY

An aspect of the present disclosure provides a behavior control device and method for an autonomous vehicle, which stably control the behavior of the autonomous vehicle by controlling the behavior of the autonomous vehicle based on the result of the deep learning after performing deep learning of the behavior pattern of the vehicle according to a driving environment even when no fusion data (fused sensor data) is received.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a behavior control device includes a learning device that performs deep learning of a behavior pattern of a vehicle according to a driving environment, and a controller that controls a behavior of the autonomous vehicle based on a result of the learning of the learning device.

The learning device may perform the deep learning of the behavior pattern of the vehicle using combined data in which various pieces of sensor data are combined, a steering wheel angle of the autonomous vehicle and path information on a precise map.

The learning device may include a first learning device that performs deep learning of a behavior pattern of a preceding vehicle using the combined data.

The first learning device may perform the deep learning of the behavior pattern of the preceding vehicle using at least one of a speed value of the preceding vehicle, brake lamp blinking information of the preceding vehicle, a speed value of a surrounding vehicle, and information on presence or absence of an intervening vehicle that is included in the combined data.

The controller may predict the behavior pattern of the preceding vehicle by applying the combined data according to a driving environment at a current point to a learning result of the first learning device and derive a speed control value of the autonomous vehicle from the predicted behavior pattern of the preceding vehicle at a reference point. In this case, the controller may derive the speed control value of the autonomous vehicle when the autonomous vehicle drives at a speed less than a first reference speed.

The learning device may include a second learning device that performs deep learning of the behavior pattern of the autonomous vehicle using the combined data, the steering wheel angle of the autonomous vehicle, and the path information on the precise map.

The second learning device may perform the deep learning of the behavior pattern of the autonomous vehicle using a lane offset value of the autonomous vehicle included in the combined data.

The controller may predict the behavior pattern of the autonomous vehicle by applying the combined data according to a driving environment at a current point, a steering wheel angle value of the autonomous vehicle at the current point, and path information on the precise map at the current point to a learning result of the second learning device and derive a steering control value of the autonomous vehicle from the predicted behavior pattern of the autonomous vehicle at a reference period. In this case, the controller may derive the steering control value of the autonomous vehicle when the autonomous vehicle drives at a speed greater than a second reference speed.

According to an aspect of the present disclosure, a behavior control method for an autonomous vehicle includes performing, by a learning device, deep learning of a behavior pattern of a vehicle according to a driving environment and controlling, by the controller, a behavior of the autonomous vehicle based on a result of the learning of the learning device.

The performing of the deep learning of the behavior pattern of the vehicle may include performing, by the learning device, the deep learning of the behavior pattern of the vehicle using combined data in which various pieces of sensor data are combined, a steering wheel angle of the autonomous vehicle and path information on a precise map.

The performing of the deep learning of the behavior pattern of the vehicle may include performing, by a first learning device, deep learning of a behavior pattern of a preceding vehicle using the combined data and performing, by a second learning device, deep learning of a behavior pattern of the autonomous vehicle using the combined data, the steering wheel angle of the autonomous vehicle and the path information on the precise map.

The performing of the deep learning of the behavior pattern of the preceding vehicle may include performing the deep learning of the behavior pattern of the preceding vehicle using at least one of a speed value of the preceding vehicle, brake lamp blinking information of the preceding vehicle, a speed value of a surrounding vehicle, or information on presence or absence of an intervening vehicle that is included in the combined data.

The controlling of the behavior of the autonomous vehicle may include predicting the behavior pattern of the preceding vehicle by applying combined data according to a driving environment at a current point to a learning result of the first learning device, and deriving a speed control value of the autonomous vehicle from the predicted behavior pattern of the preceding vehicle at a reference period.

The controlling of the behavior of the autonomous vehicle may be performed when the autonomous vehicle drives at a speed less than a first reference speed.

The performing of the deep learning of the behavior pattern of the autonomous vehicle may include performing the deep learning of the behavior pattern of the autonomous vehicle using a lane offset value of the autonomous vehicle that is included in the combined data.

The controlling of the behavior of the autonomous vehicle may include predicting the behavior pattern of the autonomous vehicle by applying the combined data according to a driving environment at a current point, a steering wheel angle of the autonomous vehicle at the current point, and path information on the precise map at the current point to a learning result of the second learning device, and deriving a steering control value of the autonomous vehicle from the predicted behavior pattern of the autonomous vehicle at a reference period.

The controlling of the behavior of the autonomous vehicle is performed when the autonomous vehicle drives at a speed greater than a second reference speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
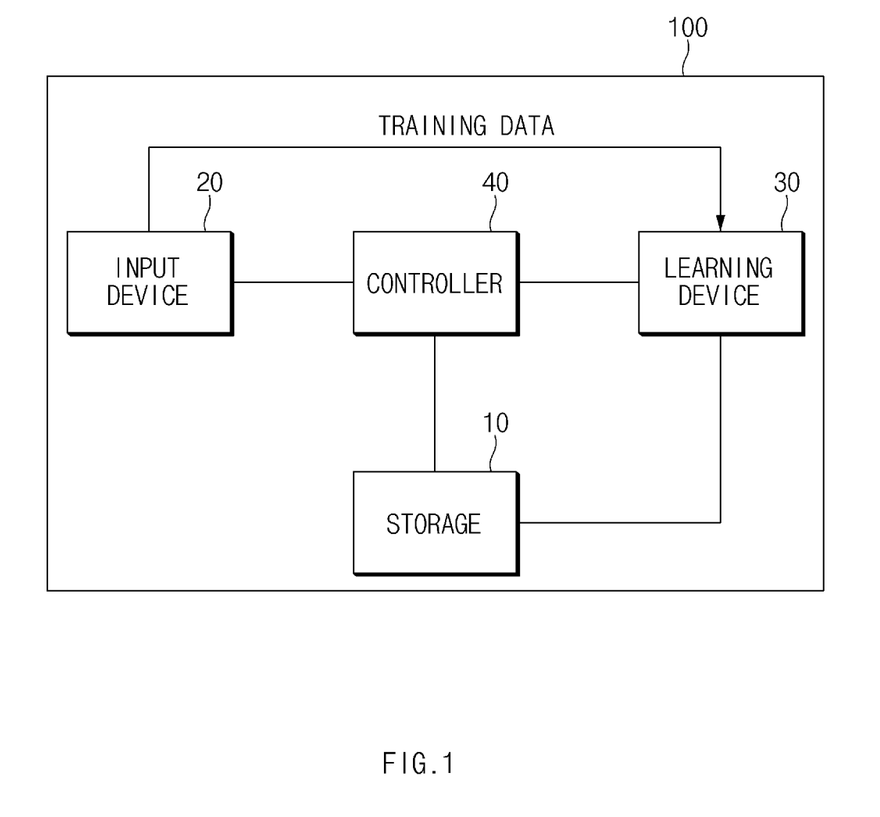
FIG. 1 is a block diagram of a behavior control device for an autonomous vehicle in one form of the present disclosure.

FIG. 1 is a block diagram of a behavior control device for an autonomous vehicle in some forms of the present disclosure.

As shown in FIG. 1, a behavior control device 100 for an autonomous vehicle in some forms of the present disclosure may include storage 10, an input device 20, a learning device 30, and a controller 40. In this case, according to a method of implementing the behavior control device 100 for the autonomous vehicle in some forms of the present disclosure, the components may be combined with each other into one entity, or some components may be omitted.

Referring to each of the above components, first, the storage 10 may store various logics, algorithms and programs required in a process of performing deep learning of a vehicle's behavior patterns according to a driving environment, and a process of controlling the behavior of the autonomous vehicle based on learning results. Here, the driving environment may be used as a concept including driving information of the autonomous vehicle, driving information of a surrounding vehicle, road information, and the like.

The storage 10 may store the learning results (a behavior prediction model of the preceding vehicle and a behavior prediction model of the autonomous vehicle) by the learning device 30. Here, the preceding vehicle may mean a vehicle driving in the same lane as the autonomous vehicle in front of the autonomous vehicle.

The storage 10 may include at least one type of storage medium among a flash memory type, a hard disk type, a micro type, and a card type (e.g., an Secure Digital (SD) card or an eXtream Digital (XD) card) of memory, and RAM (Random Access Memory), SRAM (Static RAM), ROM (Read-Only Memory), PROM (Programmable ROM), EEPROM (Electrically Erasable PROM), Magnetic Memory (MRAM), a magnetic disk, and an optical disk type of memory.

Next, the input device 20 may input (provide) data (training data) required in the process of learning the behavior pattern of the vehicle according to the surrounding environment to the learning device 30.

In addition, the input device 20 may perform a function of inputting data at a current time point which is required in the process of predicting a behavior pattern of the autonomous vehicle to the controller 40.

Next, the learning device 30 may learn the training data input through the input device 20 based on deep learning. In this case, the training data may include fusion data obtained by fusing pieces of sensor data measured by a plurality of sensors mounted in the autonomous vehicle, a steering wheel angle of the autonomous vehicle, and route information on a precise map.

The learning device 30 may perform learning in various ways. For example, the learning may be performed based on simulation in the early stage in which learning is not performed at all, and the learning may be performed based on a cloud server in the middle state in which the learning has been performed somewhat. In this case, the cloud server may collect various pieces of situation information from a plurality of vehicles performing a U-turn and infrastructure and provide the collected situation information to the autonomous vehicle as training data.

Next, the controller 40 may perform overall control such that each of the above components normally performs its function. The controller 40 may be implemented in the form of hardware or software, or may be implemented in a combination of hardware and software. Preferably, the controller 40 may be implemented with a microprocessor, but is not limited thereto The controller 40 may perform a variety of control required in the process of performing deep learning of a vehicle's behavior patterns according to a driving environment, and the process of controlling the behavior of the autonomous vehicle based on learning results.

In addition, the controller 40 may determine a behavior control value of the autonomous vehicle by applying various data at a current time point which is input through the input device 20, to the learning result of the learning device 30. That is, the controller 40 may determine the behavior control value of the autonomous vehicle corresponding to the various data at the current time point which is input through the input device 20, based on the learning result of the learning device 30.

When the autonomous vehicle is driving at a low speed (e.g., less than 30 kph) in a congestion situation, the controller 40 may predict a behavior pattern of a preceding vehicle by applying fusion data according to the driving environment at the current time point to the learning result of the learning device 30 and derive a speed control value of the autonomous vehicle based on the predicted behavior pattern of the preceding vehicle at a reference period (e.g., 10 ms). In this case, the learning device 30 may perform deep learning of the behavior pattern of a preceding vehicle by using a speed value of the preceding vehicle, brake lamp blinking information of the preceding vehicle, a speed value of a surrounding vehicle, information on the presence or absence of a vehicle which is cutting in, and the like, which are included in the fusion data.

The controller 40 may transmit the speed control value of the autonomous vehicle derived in the above-described manner to a sub-controller (e.g., an acceleration controller or a deceleration controller) at a reference period when the autonomous vehicle is driving at a low speed (e.g., less than 30 kph) in a congestion situation.

When the autonomous vehicle is driving at a high speed (for example, more than 80 kph), the controller 40 may predict a behavior pattern of the autonomous vehicle by applying fusion data according to the driving environment at the current time point, the steering wheel angle value of the autonomous vehicle at the current time point, and the route information on the precise map at the current time point to the learning result of the learning device 30 and derive a steering control value of the autonomous vehicle based on the predicted behavior pattern of the autonomous vehicle at a reference period (e.g., 10 ms). In this case, the learning device 30 may perform deep learning of the behavior pattern of the autonomous vehicle by using a lane offset value of the autonomous vehicle included in the fusion data according to the driving environment. Here, a lane offset value of the autonomous vehicle may indicate the degree to which the autonomous vehicle deviates from a center of the lane. Therefore, when the autonomous vehicle is driving in the center of the lane, the lane offset value is zero.

The controller 40 may transmit a steering control value of the autonomous vehicle derived in the above-described manner to the sub-controller (e.g., a steering controller) at a reference period when the autonomous vehicle is driving at high speed (e.g., greater than 80 kph).

Figure 2:
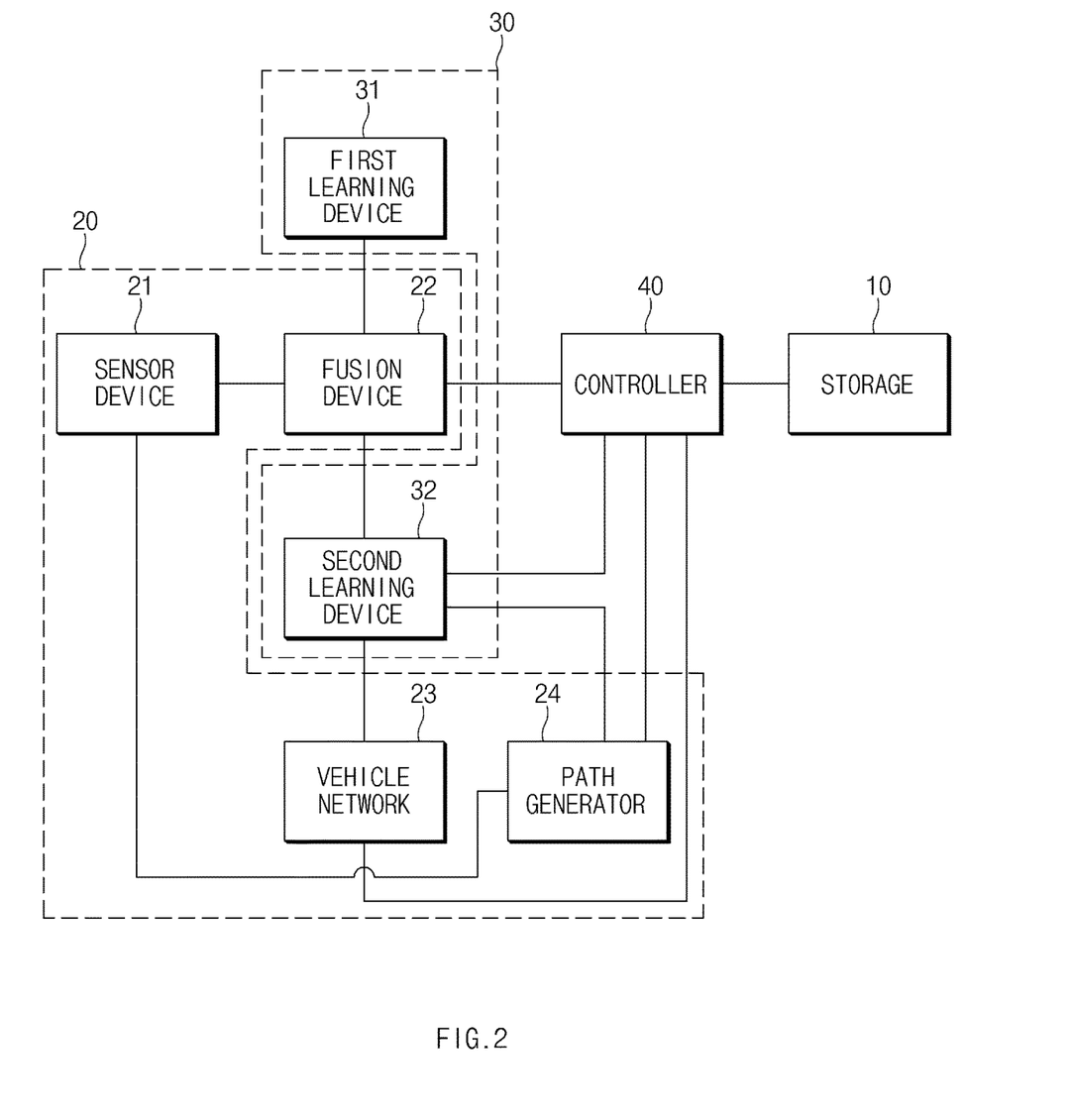
FIG. 2 is a detailed configuration diagram of a behavior control device for an autonomous vehicle in one form of the present disclosure.

FIG. 2 is a detailed configuration diagram of a behavior control device for an autonomous vehicle in some an forms of the present disclosure.

As shown in FIG. 2, the input device 20 included in the behavior control device 100 for an autonomous vehicle in some forms of the present disclosure may include a sensor device 21, a fusion device 22, and a vehicle network 23, and a path generator 24.

First, the sensor device 21 may include a Light Detection And Ranging (LiDAR) sensor, a camera, a radar (Radio Detecting And Ranging) sensor, a V2X module, a GPS (Global Positioning System) receiver, and a precise map.

The LiDAR sensor may be a kind of environmental recognition sensor and may be mounted on an autonomous vehicle to project a laser while rotating and measure positional coordinates and the like of a reflector based on return times of the laser reflected back.

The camera may be mounted behind the interior room mirror of an autonomous vehicle and capture an image including lanes, vehicles, and people located near the vehicle.

The radar sensor may receive electromagnetic waves reflected from an object after projecting the electromagnetic waves and measure a distance to the object, a direction of the object, and the like. Such a radar sensor may be mounted on the front bumper and the rear side of an autonomous vehicle, and may recognize an object at a long distance and may be hardly affected by weather.

The V2X module may include a vehicle to vehicle (V2V) module and a vehicle to infrastructure (V2I) module. The V2V module may communicate with a surrounding vehicle to obtain the position, speed, acceleration, yaw rate, and driving direction or the like of the surrounding vehicle. The V2I module may obtain the shape of a road, a surrounding structure, traffic light information (location and lighting state (red, yellow, green, or the like)) from the infrastructure.

The GPS receiver may receive a GPS signal from three or more GPS satellites.

The precise map may be a map for autonomous driving, and may include lanes, traffic lights, and sign information to accurately measure the location of an autonomous vehicle and enhance safety of autonomous driving. Such precise map itself is a well-known technique and therefore, a detailed description is omitted.

Next, the fusion device 22 may fuse various sensor data received from the sensor device 21 to generate fusion data. The technology itself for generating the fusion data in the fusion device 22 is generally well known and is not a subject matter of the present disclosure, and thus a detailed description thereof will be omitted.

Next, the vehicle network 23 may be a network for communication (data transmission/reception) between controllers in the autonomous vehicle, and may include a controller area network (CAN), a local interconnect network (LIN), a FlexRay, and a Media Oriented Systems Transport (MOST), Ethernet, and the like.

Next, the path generator 24 may generate a path of the autonomous vehicle on a road based on the fusion data obtained from the sensor device 21. In this case, the technology itself for generating the path of the autonomous vehicle in the path generator 24 is generally well known and is not a subject matter of the present disclosure, and thus a detailed description thereof will be omitted.

As illustrated in FIG. 2, the learning device 30 included in the behavior control device 100 for an autonomous vehicle in some forms of the present disclosure may include a first learning device 31 and a second learning device 32.

The first learning device 31 may receive fusion data in which pieces of sensor data measured by a plurality of sensors mounted in the autonomous vehicle are fused, as training data, and perform deep learning on a behavior pattern of a preceding vehicle. In this case, the first learning device 31 may perform deep learning on the behavior pattern of the preceding vehicle by using a speed value of the preceding vehicle, a brake lamp blinking information of the preceding vehicle, a speed value of a surrounding vehicle, information on the presence or absence of a vehicle which is cutting in, and the like which are included in the fusion data.

The second learning device 32 may receive the fusion data, a steering wheel angle value of the autonomous vehicle and path information on the precise map as the training data, and perform deep learning on the behavior pattern of the autonomous vehicle. In this case, the second learning device 32 may perform deep learning on the behavior pattern of the autonomous vehicle by using the lane offset value of the autonomous vehicle included in the fusion data.

Figure 3:
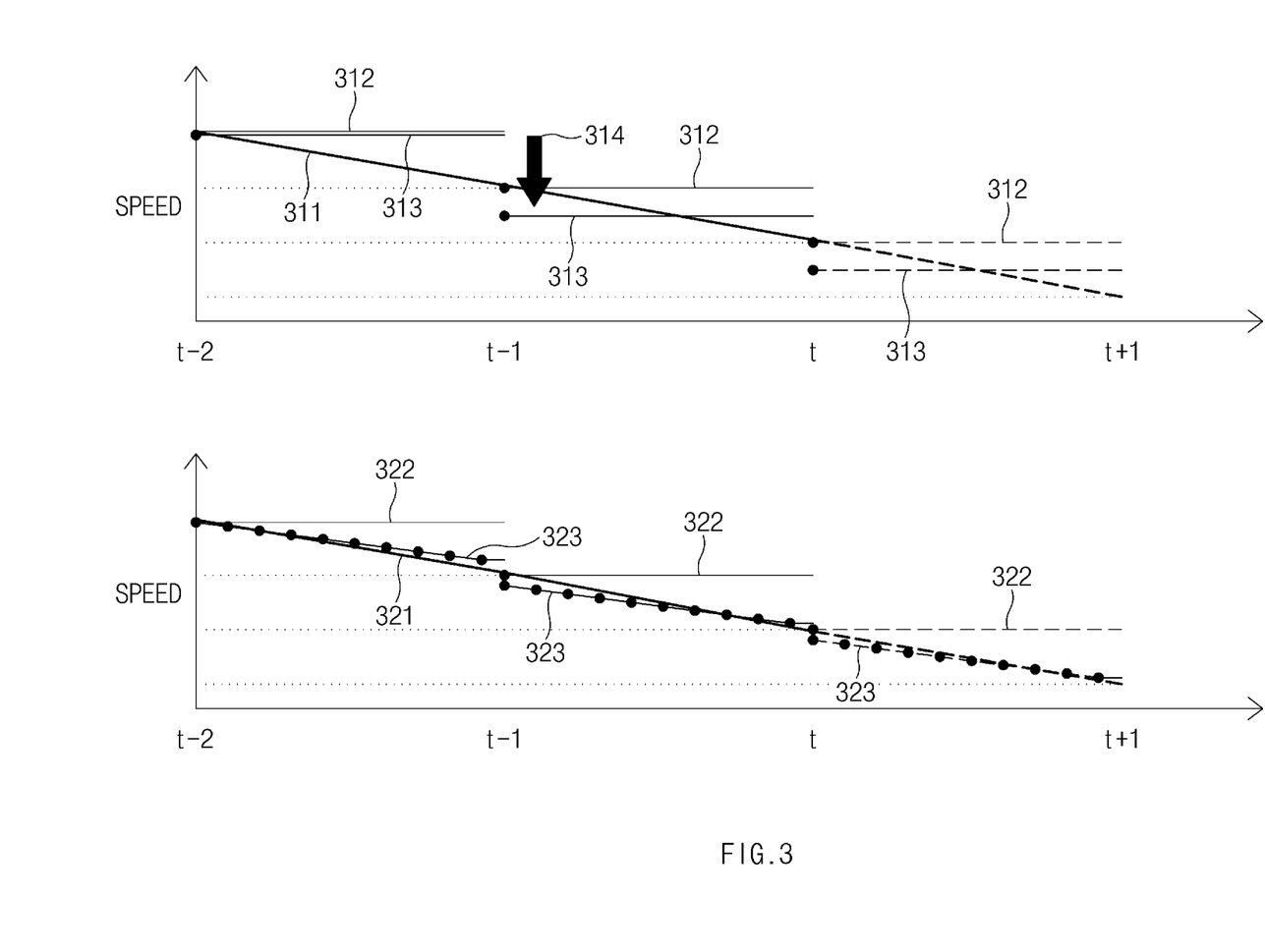
FIG. 3 is a first performance analysis diagram of a behavior control device for an autonomous vehicle in one form of the present disclosure.

FIG. 3 is a first performance analysis diagram of a behavior control device for an autonomous vehicle in some forms of the present disclosure, and illustrates a case where the autonomous vehicle is driving in a low speed (e.g., less than 30 kph) in a congestion situation.

In FIG. 3, the upper graph shows the distribution of the behavior control values of the autonomous vehicle according to the conventional method, and the lower graph shows the distribution of the behavior control values of the autonomous vehicle in some forms of the present disclosure. In this case, in the upper graph and the lower graph, the horizontal axis represents a time, and the vertical axis represents a speed as a behavior control value of the autonomous vehicle.

In the upper graph, '311' represents the real-time speed of the preceding vehicle, '312' represents the speed of the preceding vehicle transmitted by the fusion device 22 to the controller 40 at a first transmission period (e.g., 100 ms), and '313' represents a required speed of the autonomous vehicle transmitted to the sub-controller by the controller 40 at a second period (e.g., example, 10 ms).

Here, it can be seen that the speed 312 of the preceding vehicle is equal to the real-time speed 311 of the preceding vehicle at the beginning of every periods (t-2, t-1, t), but thereafter, a difference between the speed 312 of the preceding vehicle and the real-time speed 311 of the preceding vehicle continuously increases until the next transmission period is reached.

In this case, the difference 314 between the required speed of the autonomous vehicle at the time point t-2 and the required speed of the autonomous vehicle at the time point t-1 may increase, causing shifting shock in the autonomous driving vehicle.

In the lower graph, '321' represents the real-time speed of the preceding vehicle, '322' represents the speed of the preceding vehicle transmitted by the fusion device 22 to the controller 40 at the first transmission period (e.g., 100 ms), and '323' represents a required speed of the autonomous vehicle transmitted to the sub-controller by the controller 40 at a second transmission period (e.g., 10 ms).

Here, the controller 40 may predict the behavior pattern of the preceding vehicle by applying the fusion data according to a driving environment at a current time point to a learning result of the learning device 30, derive and transmit a speed control value of the autonomous vehicle from the predicted behavior pattern of the preceding vehicle to a sub-controller at a second transmission period (e.g., 10 ms). Accordingly, it can be seen that the difference between the required speeds of the autonomous vehicle is not large regardless of the first transmission period (e.g., 100 ms) of the fusion device 22. As a result, shifting shock does not occur in the autonomous vehicle.

Figure 4:
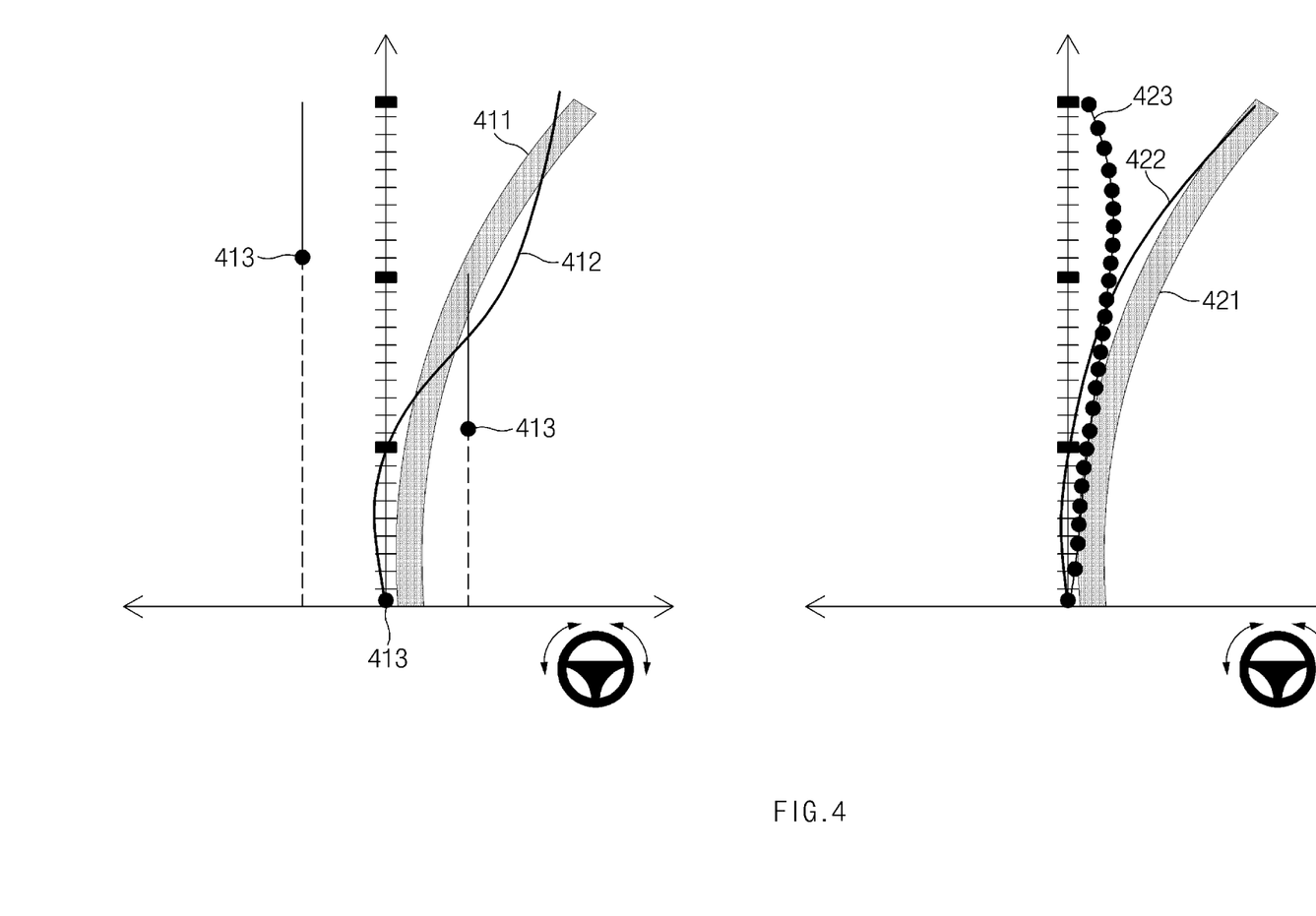
FIG. 4 is a second performance analysis diagram of a behavior control device for an autonomous vehicle in one form of the present disclosure.

FIG. 4 is a second performance analysis diagram of the behavior control device for an autonomous vehicle in some forms of the present disclosure, and illustrates a case where the autonomous vehicle derives at a high speed (e.g., greater than 80 kph).

In FIG. 4, the left graph shows distribution of behavior control values of the autonomous vehicle according to the conventional method, and the right graph shows distribution of behavior control values of the autonomous vehicle in some forms of the present disclosure. In this case, in the left graph and the right graph, the horizontal axis represents a steering wheel angle (angle value) as the behavior control value of the autonomous vehicle, and the vertical axis represents the time.

In the left graph, '411' represents a target driving path of the autonomous vehicle, '412' represents an actual driving path of the autonomous vehicle, and '413' represents the steering wheel angles of the autonomous vehicle transmitted to a sub-controller by the controller 40 at a second period (e.g., 10 ms).

Here, it can be seen that the steering wheel angle 413 of the autonomous vehicle changes significantly at every period, so that the autonomous vehicle drives away from the target driving path.

In the right graph, '421' represents a target driving path of the autonomous vehicle, '422' represents an actual driving path of the autonomous vehicle, and '423' represents the steering wheel angles of the autonomous vehicle transmitted to a sub-controller by the controller 40 at a second period (e.g., 10 ms).

Here, the controller 40 may predict a behavior pattern of the autonomous vehicle by applying fusion data according to the driving environment at the current time point, the steering wheel angle value of the autonomous vehicle at the current time point, and the path information on the precise map at the current time point to the learning result of the learning device 30, derive and transmit a steering control value of the autonomous vehicle based on the predicted behavior pattern of the autonomous vehicle to a sub-controller at a second transmission period (e.g. 10 ms). Therefore, it can be seen that the difference between the steering wheel angles of the autonomous vehicle is not large regardless of the first transmission period of the fusion device 22 (e.g., 100 ms). That is, it can be seen that a change in the steering wheel angle 423 of the autonomous vehicle is not large at every period and the autonomous vehicle follows the target driving path.

Figure 5:
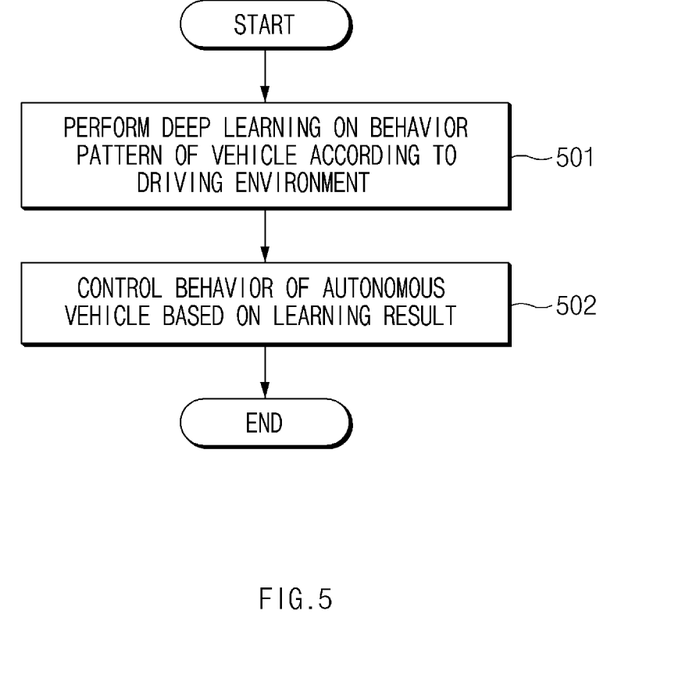
FIG. 5 is a flowchart of a behavior control method for an autonomous vehicle in one form of the present disclosure.

FIG. 5 is a flowchart of a behavior control method for an autonomous vehicle in some forms of the present disclosure.

First, the learning device 30 may perform deep learning of the behavior pattern of the vehicle according to a driving environment (501). Here, the deep learning process of the learning device 30 may be performed using any method of the well-known techniques. For reference, the deep learning or the deep neural network is a kind of machine learning, and several layers of artificial neural network (ANN) are formed between inputs and outputs and may include a convolutional neural network (CNN) or a recurrent neural network (RNN) according to a structure, a problem and a purpose to be solved.

Thereafter, the controller 40 may control the behavior of the autonomous vehicle based on the learning result of the learning device 30 (502). That is, the controller 40 may stably control the behavior of the autonomous vehicle based on the learning result of the learning device 30 even when no fusion data is received. In this case, the controller 40 may derive the speed control value of the autonomous vehicle from the learning result of the learning device 30 in the low speed situation, and drive the steering control of the autonomous vehicle from the learning result of the learning device 30 in the high speed situation.

Figure 6:
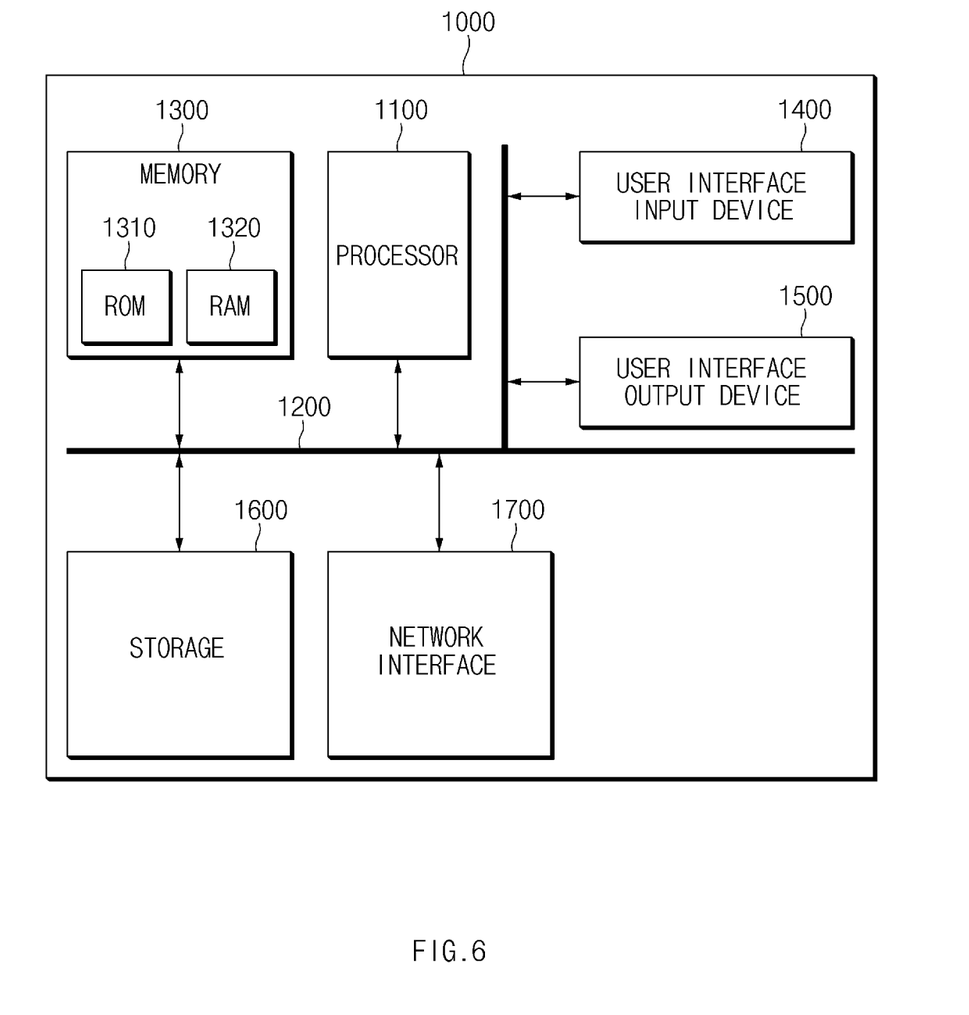
FIG. 6 is a block diagram illustrating a computing system for performing a behavior control method of an autonomous vehicle in one form of the present disclosure.

FIG. 6 is a block diagram illustrating a computing system for performing a behavior control method for an autonomous vehicle in some forms of the present disclosure.

Referring to FIG. 6, the behavior control method for an autonomous vehicle in some forms of the present disclosure as described above may be also implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, some forms of the present disclosure are provided to explain the spirit and scope of the present disclosure, but not to limit them, so that the spirit and scope of the present disclosure is not limited by some forms of the present disclosure. The scope of the present disclosure should be construed on the basis of the accompanying claims, and all the technical ideas within the scope equivalent to the claims should be included in the scope of the present disclosure.

According to the behavior control device and method for an autonomous vehicle in some forms of the present disclosure, it is possible to stably control the behavior of the autonomous vehicle even when no fusion data (fused sensor data) is received by controlling the behavior of the autonomous vehicle based on the result of the deep learning after performing deep learning of the behavior pattern of the vehicle according to a driving environment.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A behavior control device for an autonomous vehicle, the behavior control device comprising:
   a learning device configured to perform deep learning of a behavior pattern of a vehicle according to a driving environment;
   a controller configured to control a behavior of the autonomous vehicle based on a result of the learning of the learning device,
   wherein the learning device is configured to perform the deep learning of the behavior pattern of the vehicle using combined data in which various pieces of sensor data are combined, a steering wheel angle of the autonomous vehicle, and path information on a precise map.

2. The behavior control device of claim 1, wherein the learning device further comprises:
   a first learning device configured to perform deep learning of a behavior pattern of a preceding vehicle using the combined data.

3. The behavior control device of claim 2, wherein the first learning device is configured to:
   perform the deep learning of the behavior pattern of the preceding vehicle using at least one of a speed value of the preceding vehicle, brake lamp blinking information of the preceding vehicle, a speed value of a surrounding vehicle, or information on presence or absence of an intervening vehicle that is included in the combined data.

4. The behavior control device of claim 2, wherein the controller is configured to:
   predict the behavior pattern of the preceding vehicle by applying the combined data according to a driving environment at a current point to a learning result of the first learning device; and
   derive a speed control value of the autonomous vehicle from the predicted behavior pattern of the preceding vehicle at a reference point.

5. The behavior control device of claim 4, wherein the controller is configured to:
   derive the speed control value of the autonomous vehicle when the autonomous vehicle drives at a speed less than a first reference speed.

6. The behavior control device of claim 1, wherein the learning device further comprises:
   a second learning device configured to perform deep learning of the behavior pattern of the autonomous vehicle using the combined data, the steering wheel angle of the autonomous vehicle, and the path information on the precise map.

7. The behavior control device of claim 6, wherein the second learning device is configured to:
   perform deep learning of the behavior pattern of the autonomous vehicle using a lane offset value of the autonomous vehicle included in the combined data.

8. The behavior control device of claim 6, wherein the controller is configured to:
   predict the behavior pattern of the autonomous vehicle by applying the combined data according to a driving environment at a current point, a steering wheel angle of the autonomous vehicle at the current point, and path information on the precise map at the current point to a learning result of the second learning device; and
   derive a steering control value of the autonomous vehicle from the predicted behavior pattern of the autonomous vehicle at a reference period.

9. The behavior control device of claim 8, wherein the controller is configured to:
   derive the steering control value of the autonomous vehicle when the autonomous vehicle drives at a speed greater than a second reference speed.

10. A behavior control method for an autonomous vehicle, the behavior control method comprising:
    performing, by a learning device, deep learning of a behavior pattern of a vehicle according to a driving environment; and
    controlling, by a controller, a behavior of the autonomous vehicle based on a result of the learning of the learning device,
    wherein performing the deep learning of the behavior pattern of the vehicle comprises:
    performing, by the learning device, the deep learning of the behavior pattern of the vehicle using combined data in which various sensor data are combined, a steering wheel angle of the autonomous vehicle, and path information on a precise map.

11. The behavior control method of claim 10, wherein performing the deep learning of the behavior pattern of the vehicle further comprises:
    performing, by a first learning device, deep learning of a behavior pattern of a preceding vehicle using the combined data; and
    performing, by a second learning device, deep learning of a behavior pattern of the autonomous vehicle using the combined data, the steering wheel angle of the autonomous vehicle, and the path information on the precise map.

12. The behavior control method of claim 11, wherein performing the deep learning of the behavior pattern of the preceding vehicle further comprises:
    performing the deep learning of the behavior pattern of the preceding vehicle using at least one of a speed value of the preceding vehicle, brake lamp blinking information of the preceding vehicle, a speed value of a surrounding vehicle, or information on presence or absence of an intervening vehicle that is included in the combined data.

13. The behavior control method of claim 11, wherein controlling the behavior of the autonomous vehicle further comprises:
    predicting the behavior pattern of the preceding vehicle by applying the combined data according to a driving environment at a current point to a learning result of the first learning device; and
    deriving a speed control value of the autonomous vehicle from the predicted behavior pattern of the preceding vehicle at a reference period.

14. The behavior control method of claim 13, wherein controlling the behavior of the autonomous vehicle comprises:
    when the autonomous vehicle drives at a speed less than a first reference speed, controlling the behavior of the autonomous vehicle.

15. The behavior control method of claim 11, wherein performing the deep learning of the behavior pattern of the autonomous vehicle further comprises:
    performing the deep learning of the behavior pattern of the autonomous vehicle using a lane offset value of the autonomous vehicle that is included in the combined data.

16. The behavior control method of claim 11, wherein controlling the behavior of the autonomous vehicle comprises:
  predicting the behavior pattern of the autonomous vehicle by applying the combined data according to a driving environment at a current point, a steering wheel angle of the autonomous vehicle at the current point, and path information on the precise map at the current point to a learning result of the second learning device; and
  deriving a steering control value of the autonomous vehicle from the predicted behavior pattern of the autonomous vehicle at a reference period.

17. The behavior control method of claim 16, wherein controlling the behavior of the autonomous vehicle comprises:
  when the autonomous vehicle drives at a speed greater than a second reference speed, controlling the behavior of the autonomous vehicle.

* * * * *